Patented Aug. 30, 1927.

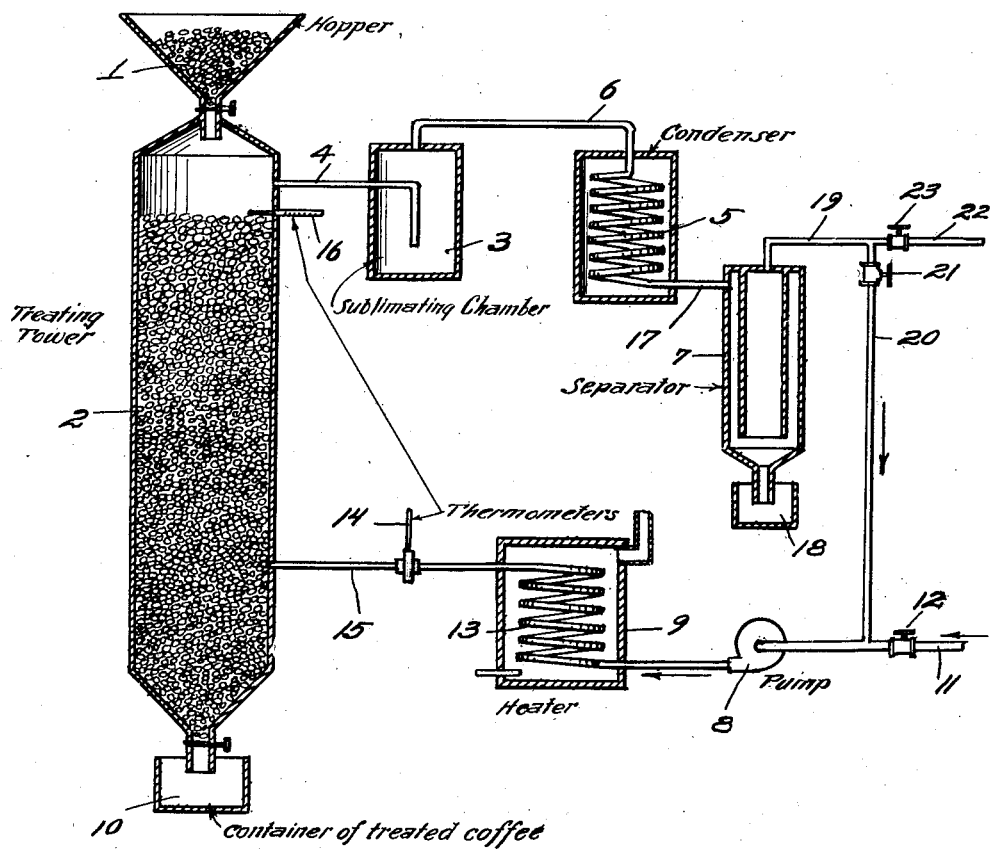

1,640,648

UNITED STATES PATENT OFFICE.

ROY CROSS, OF KANSAS CITY, MISSOURI.

METHOD OF TREATING COFFEE.

Application filed November 2, 1925. Serial No. 66,192.

This invention relates to improvements in a method of treating coffee, and refers more particularly to a process of decaffeinizing or removing the caffeine from the coffee beans or ground coffee.

Among the objects of the invention are, to provide a process in which the coffee is first treated by an alkaline agent to convert the caffeine so that it exists in the coffee in alkaloidal state; to provide a process in which the caffeine is then treated by means of an inert gas to sublime the caffeine and separate the same in a primary condensing stage; to provide a process in which the volatile oils, including the aromatic oils which are carried off with the vapors, are returned to the coffee so that the flavor is restored; to provide a process by means of which the coffee may be roasted and decaffeinized in a single treatment, and, in general, to provide a process hereinafter described in more detail. The single figure is a side diagrammatic view of an apparatus adaptable for carrying out this process.

Referring to the drawings, at 1 is shown a hopper mounted in the top of an insulated or steam jacketed treater 2. Three (3) is a circulating chamber connected to the treater by means of a vapor pipe 4; a condenser 5 is connected to the circulating chamber by a vapor line 6; at 7 is shown a separator; at 8 a pump, and at 9 a heater; 10 is a container into which the coffee is drawn off after treatment.

Referring now to the particular manner in which the coffee is decaffeinized and roasted, the coffee beans or ground coffee is first treated with an alkaline substance such as lime, magnesia, sodium bicarbonate, sodium carbonate, sodium hydroxide, potassium bicarbonate or other alkaline materials. This treatment is carried on at temperatures up to 210° F. After treatment, the caffeine in the coffee is present in an alkaloidal state which facilitates its subsequent removal according to the process hereinafter described. The use of steam—preferably at slightly elevated pressure—with the alkaline treatment considerably hastens the treatment.

After the treatment with the alkaline material, and with or without steam according to the amount of caffeine to be removed and the amount present in the coffee, the beans or ground coffee are introduced to the treater through the hopper 1 and collected in a body in the insulated treater. This treater may be externally heated, although as satisfactory results may be obtained by using an insulated heater and introducing a highly heated gas to be circulated through the body of coffee from a heating stage.

Inert gas, such as carbon dioxide, steam, nitrogen, hydrogen or other relatively inert gaseous materials, either in combination or singly, is introduced through the line 11 controlled by a valve 12, the gas used being pumped by means of the pump 8 through a heating coil 13 mounted in the heater 9. In this heater, the gas circulated through the coil is raised to a temperature of 300° F. to 350° F., this temperature being ascertained by means of a thermometer 14 in the line 15 communicating between the heater and the treater. The high temperature of the gases is accurately regulated to prevent scorching of the coffee and at the same time the temperatures sufficient to drive off in a vapor state the caffeine from the body of the coffee in the treater. In addition to, or in lieu of, the circulation of an inert gas, steam may be added through a separate line in its circulation through the system. The volatile material, including the vaporized caffeine and volatile oils including aromatic oils, pass off through the line 4 into the distilling chamber. A thermometer 16 is positioned near the top of the treater in order that the temperature may be accurately controlled. The caffeine volatilizing at a higher temperature than the volatile oils driven off is the first product to be separated out as a crystalline material in the circulating chamber 3. The more volatile oils passing off from the circulating chamber to the container through the line 6 where they are further cooled and condensed, the resulting fluid being directed through the pipe 17 to a fluid separator 7 where the water and light oils accumulate in a collecting container 18 while the uncondensed substances pass off through the line 19 and are recycled through the pipe 20 controlled by a valve 21, or may be drawn off through a line 22 regulated by a valve 23. The inert gas and uncondensed steam is preferably recycled for reheating and retreating purposes. The treated or decaffeinized coffee is discharged through the lower end of the treater into a container 10. Any of the desirable aromatic oils that have been eliminated by the treatment may be subsequently added to this coffee as they are collected in the container 18 and preserved for this specific purpose.

The process, if operated at accurately controlled temperatures, produces a coffee which retains the typical aroma while the caffeine content has been practically eliminated. A typical case where caffeine was removed from coffee in the present process, consists of treatment of coffee containing 1.75% of caffeine in the original bean. After treating with an alkaline substance and steam and then with steam and an inert gas at temperatures slightly in excess of 300° F., the caffeine content was reduced to .35%, while the treated and roasted coffee retained its original aroma. The inert gas used in this treatment was carbon dioxide, although good results have been obtained with both nitrogen and hydrogen.

I claim as my invention:

1. A process for the treatment of coffee which comprises the steps of soaking coffee with an alkaline substance, passing a heated inert gas through a body of said alkaline treated coffee, separating the caffeine in a circulating stage and the water and volatile oils in a separating stage, and recycling the uncondensed material through the coffee undergoing treatment.

2. A process of decaffeinizing coffee, which comprises the steps of treating coffee with an alkaline substance, introducing it to a treater, passing an inert gas or vapor through the coffee contained in the treater, separating the caffeine in a circulating stage and the volatile oils in a separating stage, recycling the uncondensed material, reheating it and again passing it through the coffee body and withdrawing the roasted and treated coffee from the treater.

3. A process of decaffeinizing coffee, which comprises the steps of treating coffee with an alkaline substance, introducing it to a treater, passing carbon dioxide through the coffee contained in the treater, separating the caffeine in a circulating stage and the volatile oils in a separating stage, recycling the uncondensed material, reheating it and again passing it through the coffee body and withdrawing the roasted and treated coffee from the treater.

4. A process of decaffeinizing coffee, which comprises the steps of treating coffee with an alkaline substance, introducing it to a treater, passing a heated inert gas through the coffee contained in the treater, separating the caffeine in a circulating stage and the volatile oils in a separating stage, recycling the uncondensed material, reheating it and again passing it through the coffee body, and withdrawing the roasted and treated coffee from the treater.

5. A process for treating coffee comprising soaking coffee with an alkaline substance, heating the mixture at elevated temperature, passing an inert gas heated to roasting temperature through the alkaline treated coffee, separately removing caffeine and volatile oils, reheating and recycling the uncondensed matter through the coffee body.

ROY CROSS.